(12) United States Patent
Nader et al.

(10) Patent No.: US 11,924,759 B2
(45) Date of Patent: Mar. 5, 2024

(54) DETERMINATION OF OPERATIONAL STATE

(71) Applicant: Telefonaktiebolaget LM Ericsson (PUBL), Stockholm (SE)

(72) Inventors: Ali Nader, Malmö (SE); Tahmineh Torabian Esfahani, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/909,913

(22) PCT Filed: Mar. 18, 2020

(86) PCT No.: PCT/EP2020/057421
§ 371 (c)(1),
(2) Date: Sep. 7, 2022

(87) PCT Pub. No.: WO2021/185437
PCT Pub. Date: Sep. 23, 2021

(65) Prior Publication Data
US 2023/0107347 A1    Apr. 6, 2023

(51) Int. Cl.
*H04W 76/27* (2018.01)
*H04W 52/02* (2009.01)
(Continued)

(52) U.S. Cl.
CPC ....... *H04W 52/0229* (2013.01); *H04W 76/25* (2018.02); *H04W 76/27* (2018.02); *H04W 76/28* (2018.02)

(58) Field of Classification Search
CPC . H04W 52/0229; H04W 76/25; H04W 76/27; H04W 76/28; H04W 52/02; H04W 76/30; Y02D 30/70
See application file for complete search history.

(56) References Cited

U.S. PATENT DOCUMENTS 10,764,861 B2 *  9/2020  Ishii ...................... H04W 76/27
11,166,363 B2 * 11/2021  Keränen ................ H05K 1/181
(Continued)

FOREIGN PATENT DOCUMENTS

WO    2019 031827 A1    2/2019

OTHER PUBLICATIONS

PCT International Search Report issued for International application No. PCT/EP2020/057421—dated Dec. 2, 2020.
(Continued)

*Primary Examiner* — Andrew Wendell
(74) *Attorney, Agent, or Firm* — BAKER BOTTS L.L.P.

(57) ABSTRACT

Disclosed herein is a method of a communication device operating in a wireless communication network for managing power consumption of the device. The device is configured to operate according to first, second and third operational states for communication with a network node associated with the communication network. The method comprises receiving from the network node an instruction to transit to a decided operational state when leaving the first operational state, the decided operational state being one of the second or third operational state; obtaining information of a first network configuration applied by the network node for the second operational state and information of a second network configuration applied by the network node for the third operational state; determining to operate according to the second operational state or the third operational state based on the obtained information; and transit to the determined operational state when leaving the first operational state regardless of the decided operational state.

22 Claims, 1 Drawing Sheet

(51) Int. Cl.
  *H04W 76/25*   (2018.01)
  *H04W 76/28*   (2018.01)

(56) References Cited

U.S. PATENT DOCUMENTS

| | | | |
|---|---|---|---|
| 11,734,937 B1 * | 8/2023 | Pushkin | G06N 3/044 |
| | | | 706/12 |
| 2017/0238360 A1 * | 8/2017 | Chen | H04W 80/08 |
| | | | 370/328 |
| 2018/0270895 A1 * | 9/2018 | Park | H04W 24/04 |
| 2019/0268963 A1 | 8/2019 | Kim et al. | |
| 2020/0267690 A1 * | 8/2020 | Hsieh | H04W 76/28 |
| 2020/0314700 A1 * | 10/2020 | Da Silva | H04W 36/04 |
| 2021/0076450 A1 * | 3/2021 | Jiang | H04W 24/02 |
| 2021/0127448 A1 * | 4/2021 | Kadiri | H04W 52/0219 |
| 2021/0251039 A1 * | 8/2021 | Liang | H04W 76/23 |
| 2021/0321446 A1 * | 10/2021 | Lee | H04L 5/0094 |
| 2022/0167301 A1 * | 5/2022 | Goyal | G01S 5/0236 |
| 2022/0174727 A1 * | 6/2022 | Yerramalli | H04W 76/27 |
| 2023/0107347 A1 * | 4/2023 | Nader | H04W 76/27 |
| | | | 455/522 |

OTHER PUBLICATIONS

PCT Written Opinion of The International Searching Authority issued for International application No. PCT/EP2020/057421—dated Dec. 2, 2020.

* cited by examiner

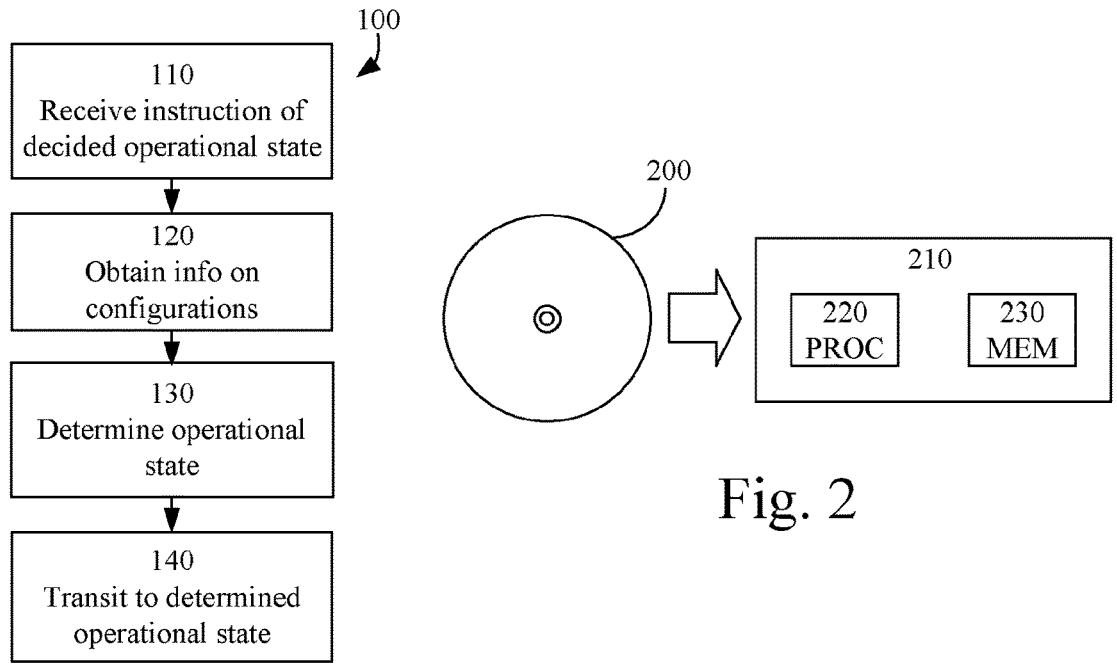
Fig. 1
Fig. 2
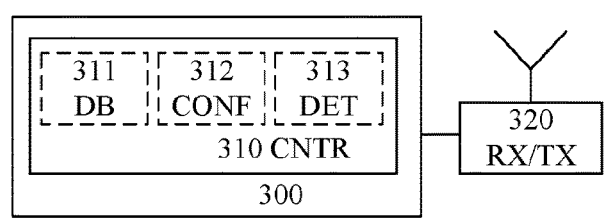
Fig. 3
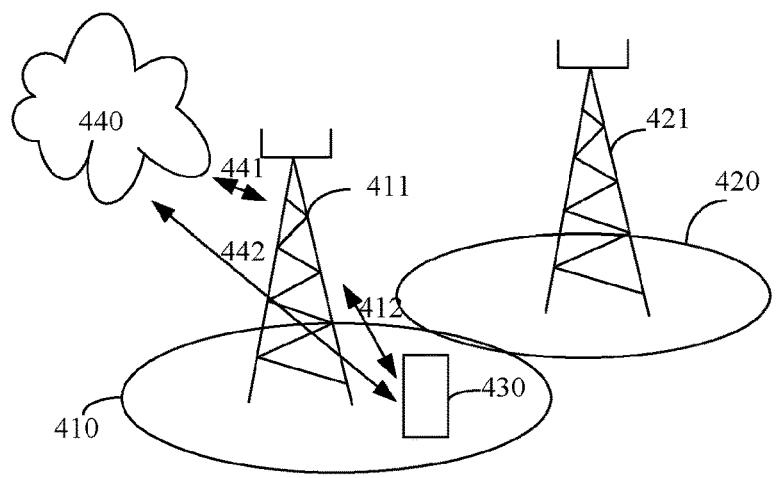
Fig. 4

DETERMINATION OF OPERATIONAL STATE

PRIORITY

This nonprovisional application is a U.S. National Stage Filing under 35 U.S.C. § 371 of International Patent Application Serial No. PCT/EP2020/057421 filed Mar. 18, 2020 and entitled "DETERMINATION OF OPERATIONAL STATE" which is hereby incorporated by reference in its entirety.

TECHNICAL FIELD

The present invention relates generally to the field of wireless communication. More particularly, it relates to determination of operational state of a communication device operating in a wireless communication network.

BACKGROUND

In Rel-15 3GPP NR (third generation partnership project New Radio), a new RRC (Radio Resource Control; layer 3) state called RRC_INACTIVE has been introduced in addition to the conventional LTE-based RRC_IDLE, and RRC_CONNECTED states for the purpose of power saving and signaling overhead reduction. In this new state, the user equipment (UE) typically behaves quite similarly to the RRC_IDLE state. A main difference is however that the UE keeps/stores the NR configurations while in RRC_INACTIVE and restores them upon resuming the connection towards the network (NW) in RRC_CONNECTED state. On the NW (network) side, the gNBs store the UE context including the UE's configurations while the UE is in RRC_INACTIVE state and retrieve the context upon resumption of the connection. Potentially, this context may be moved between various gNBs via NW interfaces in case the UE has moved and tries to resume the connection in a cell connected to another gNB.

Transitions between RRC_INACTIVE and RRC_CONNECTED states are generally more efficient compared to transitions between RRC_IDLE and RRC_CONNECTED states from a signaling perspective. To setup or resume a connection as such implies the same number of RRC messages exchanged between the UE and NW over the air. However, for a UE connecting from RRC_IDLE state, typically there is a continued set of procedures related to security activation and possible RRC reconfiguration before user data exchange can be allowed. These procedures are typically not accommodated for a UE connecting from RRC_INACTIVE state as the configurations and security contexts are stored in the UE and NW.

It is the gNB that decides whether the UE shall leave the RRC_CONNECTED state and thereby releases the RRC connection. Also, the gNB decides which of the two states RRC_IDLE/RRC_INACTIVE the UE shall transit to upon release of the connection. The UE transits from RRC_CONNECTED to RRC_IDLE/RRC_INACTIVE state upon reception of RRCRelease or RRCSuspend message from the NW.

In 3GPP Rel16, there are discussions about introducing means for the UE to indicate its preference about the release state to the network (i.e. whether the UE prefers to be released to RRC_IDLE or RRC_INACTIVE upon release). However, even if the NW follows the UE preference, the preference is typically only valid at the point in time where the UE is leaving the connected state and may not necessarily help the UE to e.g. conserve power. Therefore, there is a need for alternative approaches for state determination and power conversion.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an apparatus is referred to herein, it is to be understood as a physical product. The physical product may comprise one or more parts, such as controlling circuitry in the form of one or more controllers, one or more processors, or the like.

It is an object of some embodiments to solve or mitigate, alleviate, or eliminate at least some of the above disadvantages and to provide methods and apparatuses for a communication device for power management.

According to a first aspect, this is achieved by a method of a communication device operating in a wireless communication network for managing power consumption of the device. The device is configured to operate according to first, second and third operational states for communication with a network node associated with the communication network. The method comprises receiving from the network node an instruction to transit to a decided operational state when leaving the first operational state, the decided operational state being one of the second or third operational state.

The method also comprises obtaining information of a first network configuration applied by the network node for the second operational state and information of a second network configuration applied by the network node for the third operational state;

The method also comprises determining to operate according to the second operational state or the third operational state based on the obtained information and transit to the determined operational state when leaving the first operational state regardless of the decided operational state.

In some embodiments, the method may further comprise operating according to the determined operational state by retaining a respective operational configuration associated with the determined operational state and the decided operational state.

In some embodiments, the method may further comprise determining to operate according second or third operational state based on determining a delete frequency for when the network node deletes data context associated with the communication device when the communication device operates in the second operational state.

In some embodiments, determining the delete frequency comprises collecting and storing in a database of the communication device, during communication with the network node, context information pertaining to when and where the network node deletes data context associated with the communication device, when the communication device operates in the second operational state. The delete frequency is determined based on the stored context information.

In some embodiments, the first operational state is a Radio Resource Control, RRC, connected operational state, the second operational state is an RRC inactive operational state and the third operational state is a RRC idle operational state.

In some embodiments, the second operational state has a shorter Discontinuous Reception, DRX, cycle than the third operational state.

In some embodiments, determining to operate according to the second or third operational state is based on a size of at least one registration area associated with the second operational state.

In some embodiments, the method may further comprise operating according to the third operational state, by determining whether a connection to the network node should be maintained and determining a duration of a timer of the network node, wherein the timer indicates when the device will be completely dropped by the network node. The method may further comprise performing a connection set up against the network node before the timer expires when it is determined that the connection to the network node should be maintained.

In some embodiments, the determination whether the connection to the network node should be maintained is based on one or more of knowledge of future communication transmissions to the network node, knowledge of a geographical area surrounding the network node, knowledge of a tracking area associated with the network node, and knowledge of one or more neighbouring cells.

In some embodiments, the method may further comprise repeatedly evaluating the determined operational state compared to the decided operational state based on current network conditions and determining whether the determined operational state should be maintained based on the current network conditions.

In some embodiments, current network conditions relate to at least one of time of the day, network topology, network congestion, device velocity, planned device activity, the determined delete frequency, a and network node tracking area size.

A second aspect is a computer program product comprising a non-transitory computer readable medium. The non-transitory computer readable medium has stored there on a computer program comprising program instructions. The computer program is configured to be loadable into a data-processing unit, comprising a processor and a memory associated with or integral to the data-processing unit. When loaded into the data-processing unit, the computer program is configured to be stored in the memory. The computer program, when loaded into and run by the processor is configured to cause the processor to execute method steps according to the first aspect.

A third aspect is an apparatus for a communication device operating in a wireless communication network for managing power consumption of the device. The device is configured to operate according to first, second and third operational states for communication with a network node associated with the communication network. The network node is configured to decide whether the device is to transit to the second or third operational state from the first operational state. The apparatus comprises a controller configured to cause reception from the network node of an instruction to transit to a decided operational state when leaving the first operational state, the decided operational state being one of the second or third operational state.

The controller is configured to cause obtaining of information of a first network configuration applied by the network node for the second operational state and information of a second network configuration applied by the network node for the third operational state.

The controller is also configured to cause determination to operate according to the second operational state or the third operational state based on the obtained information and transition to the determined operational state when leaving the first operational state regardless of the decided operational state.

A fourth aspect is a communication device comprising the apparatus according to the second aspect and configured to carry out the method according to the first aspect.

In some embodiments, any of the above aspects may additionally have features identical with or corresponding to any of the various features as explained above for any of the other aspects.

An advantage of some embodiments is that a communication device is enabled to operate according to a most suitable operational state based on gathered network data which may lead to power savings for the device.

Yet an advantage of some embodiments is that the communication device can determine an operational state regardless of what the network node has decided.

Yet an advantage with some embodiments is that overall network performance is enhanced since the device is enabled to dynamically change between operational states based on current network conditions.

Yet an advantage of some embodiments is that unnecessary disconnections between network and device are avoided.

Yet an advantage of some embodiments is that signalling over the air is reduced which may lead to reduced network resource consumption, reduced interference and reduced network and communication device power consumption.

BRIEF DESCRIPTION OF THE DRAWINGS

Further objects, features and advantages will appear from the following detailed description of embodiments, with reference being made to the accompanying drawings, in which:

FIG. 1 is a flowchart illustrating example method steps according to some embodiments;

FIG. 2 is a schematic drawing illustrating an example computer program product according to some embodiments;

FIG. 3 is a schematic drawing illustrating an example apparatus according to some embodiments; and FIG. 4 is a schematic drawing illustrating a network scenario according to some embodiments.

DETAILED DESCRIPTION

In the following, embodiments will be described where power management of a communication device is enabled by allowing the communication device to determine a suitable operational state based on one or more network configurations regardless of what operational state has been determined by the network. It should be noted that when referring to the network in this disclosure, a core network and/or a network node may be meant. The communication device may e.g. receive information and/or communicate with both the core network and the network node both directly and indirectly. It should hence be noted that the terms network, core network and network node (e.g. a base station, a network terminal, an eNB or gNB) may be used interchangeably in this disclosure.

It should be noted that the term UE (user equipment) may be used interchangeably with the term communication device in this disclosure. A communication device may e.g. be a smart phone, mobile phone, network terminal, computer, surf plate, machine-to machine device or any other device capable of communicating in a wireless communication network.

As mentioned above, the behavior of the UE in RRC_IDLE and RRC_INACTIVE are very alike (see e.g. 3GPP 38.304, 38.331). In both states, the UE operates e.g. in a Discontinuous Reception (DRX) mode looking for potential paging messages from the NW. Also, the UE typically announces its presence to the NW on a periodic manner and when entering a new registration area. However, the configuration of the parameters, DRX cycles and registration area sizes, can be configured differently for the different operational states (i.e., connected, inactive and idle). Furthermore, a UE in RRC_INACTIVE state, shall typically look for paging messages initiated from both from Core NW (CN) and gNBs of a Radio Access NW (RAN). The main reason for this is to be able to cater for potential state mismatch between the involved parties. Depending on configured DRX cycles for the two states, the paging occasions may further overlap partly or fully.

Whether it is more beneficial to release a UE to RRC_IDLE state or suspend it to RRC_INACTIVE state depends on the NW configurations for the operational states (registration area sizes, and DRX cycles), UE mobility state, traffic characteristics, etc. A UE that is not moving so much and is involved in frequent transitions to RRC_CONNECTED states typically benefits from being in RRC_INACTIVE rather than RRC_IDLE state as it involves less signaling to set up the connection.

Furthermore, it is difficult to have a NW configuration for the two operational states mentioned herein (i.e. inactive and idle; and trying to keep the configurations aligned/same/similar) suitable for all type of UEs and NW nodes deployed in various parts of the NW. For example, ideally an operator might want to have the same DRX cycle configuration for the two operational states and aim for having all UEs in RRC_INACTIVE when not involved in data exchange (i.e. when not in RRC_CONNECTED). However, a long DRX cycle which is beneficial from UE power saving perspective might have negative impact on the NW nodes as incoming data needs to be buffered in the gNB while the gNB is trying to find (page) the UE for connection resumption. Especially in a busy traffic area and at busy hours, this might supersede the buffering capacity of the network nodes and some UEs' contexts will typically have to be preempted leading to state mismatch; i.e. some UEs think they are in RRC_INACTIVE state when in reality their context has been cleaned out in the gNB. One remedy may be to have a shorter DRX cycle for UEs in RRC_INACTIVE state and a longer one for UEs in RRC_IDLE.

A similar issue exists in regard to configuration of registration area sizes associated with the respective two operational states. A typically smaller size for RRC_INACTIVE registration area may lead to excessive signaling for UEs upon movement which is both costly for the UE in terms of power and costly for the NW in terms of traffic over the air. On the other hand, would the registration area associated with the inactive operational mode be set too large (e.g. for countering the above mentioned problem) it may lead to less detailed position knowledge of the gNB when paging the UE and having to page the UE in a broader area leading again to excessive signaling over the air.

A typically small registration area size may e.g. be an area comprising 1-15 gNBs. A typically large registration area size may e.g. be an area comprising more than 15 gNBs.

Furthermore, for RRC_INACTIVE state the UE's RNA (RAN Notification Area) is configured in the node level which is the area that the UE is allowed to move without notifying the network. UE location is known at RNA level at the network. However, this state is invisible from the core network perspective and UE is interpreted as being in the connected state. The registration area for RRC_INACTIVE UEs is received from an AMF (access and mobility management function, core network) which is advertised in CoreNetwork Assistance Information. The received registration area from the core network for RRC_INACTIVE UE is used to calculate the RNA.

The smallest size of RNA can be 1 cell. An RNA can also be a list of tracking areas.

Hence, the UE may determine a suitable operational state based on the RNA, or based on the RNA in relation to the size of the registration area. E.g. the network may believe that the UE is in RRC_connected state, based on the RNA, but the UE has determined that RRC_IDLE state is more preferable based on e.g. the size of the registration area.

Hence, it is not straightforward what exact configuration the NW/operator should have at different areas and which UEs the NW should send to RRC_IDLE vs RRC_INACTIVE. At the same time, the number of RRC_INACTIVE UEs cannot be unlimited, because network resources are needed for storing and maintaining RRC_INACTIVE UE contexts and buffer potential incoming data while UE is being paged. As previously noted, in 3GPP Rel16, there are discussions about introducing means for the UE to indicate its preference about the release state to the network. However, even if the NW follows the UE preference, the preference is typically only valid at the point in time where the UE is leaving the connected state.

Regardless of above, there is still a high risk that a gNB at some point during its operation reaches its capacity limits and as result has to let go of some RRC_INACTIVE UE contexts to make place for other activity/other UEs. Doing this in a controlled manner (i.e. paging the RRC_INACTIVE UE, setting up a connection just for releasing it to RRC_IDLE) typically implies a high signaling load, therefore the most straightforward way is to just delete the UE context in the gNB. This typically leads to that, upon later connection resumption from the UE side, the UE will fail to resume and "fall back" to ordinary connection setup. In the context of this disclosure, this is called a "state mismatch" between the UE and NW, i.e. the network node has released the UE completely, but the UE believes it is still in RRC_INACTIVE operational state. In a case where a different DRX cycle is configured for RRC_INACTIVE state compared to RRC_IDLE state, the UE wakes up extra times to monitor only RAN paging (i.e. short DRX cycle for RRC_INACTIVE state). These extra decoding occasions during state mismatch for inactive UEs consume UE battery life completely in vain as they will not be paged since the NW has deleted their context. Hence, new mechanisms are beneficial to implement in the UE for determining an operational state of the UE for e.g. the sake of power savings.

FIG. 1 illustrates a method 100 according to some embodiments. The method 100 may be a method of a communication device operating in a wireless communication network for managing power consumption of the device. The device may be configured to operate according to first, second and third operational states for communication with a network node associated with the communication network.

In some embodiments, the first operational state is a Radio Resource Control, RRC, connected operational state, the second operational state is an RRC inactive operational state and the third operational state is a RRC idle operational state.

The method 100 may start in step 110 with receiving from the network node an instruction to transit to a decided operational state when leaving the first operational state, the decided operational state being one of the second or third operational state.

The method 100 may then continue in step 120 with the communication device obtaining information of a first network configuration applied by the network node for the second operational state and information of a second network configuration applied by the network node for the third operational state.

The method 100 may then continue in step 130 with the communication device determining to operate according to the second operational state or the third operational state based on the obtained information and in step 140 the communication device transits to the determined operational state when leaving the first operational state regardless of the decided operational state.

Hence, the method 100 enables the communication device to enter a state implicitly. I.e. the network node believes that the communication device is operating in the state which has been decided by the network node, however, the communication device operates according to the state it has determined to be most beneficial to be in based on the obtained network configuration associated with each state.

This may in some embodiments be achieved by the method 100 further comprising operating according to the determined operational state by retaining a respective operational configuration associated with the determined operational state and the decided operational state.

The operational configurations may e.g. comprise parameters relating to a length of Discontinuous Reception, DRX, cycles for a respective operational state and/or a tracking area size.

The network configurations associated with the respective operational state may e.g. be obtained by broadcast or unicast from the network (network node), or it may be requested by the communication device.

From the obtained network configurations the communication device may deduce the operational configurations. I.e. the network configurations and the operational configurations may be the same. E.g. the obtained network configurations associated with the respective operational state may inform the communication device that the second operational state has a first DRX cycle and a first size of tracking area, whereas the third operational state has a second DRX cycle and a second size of tracking area size. The communication device may apply this information to form the operational configurations for each of the states. I.e. when the device is to operate according to the second operational state it should apply the first DRX cycle and when it operates according to the third operational state it should apply the second DRX cycle. This is possible since the device retains the operational configurations for each state.

In some embodiments, the method 100 may further comprise determining to operate according second or third operational state based on determining a delete frequency for when the network node deletes data context associated with the communication device when the communication device operates in the second operational state.

In some embodiments, determining the delete frequency comprises collecting and storing in a database of the communication device, during communication with the network node, context information pertaining to when and where the network node deletes data context associated with the communication device, when the communication device operates in the second operational state. The delete frequency is determined based on the stored context information.

Hence, according to some embodiments, the method 100 may enable the communication device to determine whether there is an RRC_INACTIVE state mismatch between the UE and the NW(node). More specifically, whether the UE context has been deleted in the NW while the UE is in RRC_INACTIVE state. Furthermore, the UE may keep track of whether this is a reoccurring NW behaviour and whether this behaviour is connected to certain deployment area (PLMN (Public Land Mobile Network), Cell(s), geographical area, or alike) and time of day, week, month, etc. Hence based on such information, the communication device may determine delete statistics which may be the same or may be used for determining the above described delete frequency. For the same location/times associated with the delete frequency, the UE may also keep track of whether the NW-provided configurations (be it broadcast or dedicated), for the two states RRC_INACTIVE and RRC_IDLE differ.

In some embodiments, the method 100 may thus also comprise repeatedly evaluating the determined operational state compared to the decided operational state based on current network conditions and determining whether the determined operational state should be maintained based on the current network conditions (possibly in correlation to the obtained information associated with the network configuration for the respective operational state). In some embodiments, current network conditions may relate to at least one of time of the day, network topology, network congestion, device velocity, planned device activity, the determined delete frequency, and network node tracking area size Furthermore, such network provided configurations (which may e.g. in some embodiments be the operational configurations described above) as described above and which may be used for determining an operational state by the communication device could for example be different DRX cycle settings used for paging and/or different registration area sizes and timers leading to registration area update procedure by the UE. The second and third operational states may e.g. be associated with different DRX cycles and different registration area sizes.

Hence in some embodiments, the second operational state has a shorter Discontinuous Reception, DRX, cycle than the third operational state.

Further, in some embodiments, determining to operate according to the second or third operational state is based on a size of at least one registration area associated with the second operational state. E.g. in some embodiments, the device may determine to operate according to the second operational state if the size of the current registration area (and possibly of neighbouring registration areas) is smaller than a size for a registration area associated with the third operational state as indicated by the obtained network configuration.

Furthermore, as noted above, a large registration area may result in that the third operational state is more beneficial in terms of power saving than the second operational state (e.g. if the third operational state is RRC_IDLE and the second is RRC_INACTIVE) since fewer transitions are made and thus less data need to be exchanged.

In some embodiments, even if there is no state mismatch but the UE finds it beneficial to leave the RRC_INACTIVE state (e.g. based on the network configuration and/or the UE is close to running out of power and/or it just knows that there will not be any data transaction during long time ahead) the UE may determine that the third operational state is more beneficial and may just leave the RRC_INACTIVE state and go to RRC_IDLE (e.g. by keeping the configurations for each respective state) without having to notify the network node. It may e.g. be that the transition to RRC_INACTIVE was based on UE preference provided to the NW (e.g. the UE may be required to send its preference to the NW) suitable at the last point in time the UE left RRC_CONNECTED state, but after some time the UE preference has changed.

As long as the UE thinks that there is a chance that the NW might maintain the UE's RRC_INACTIVE state, even though the UE has left the RRC_INACTIVE state implicitly without NW node knowing this, it may still maintain its RRC_INACTIVE configurations and may look for its RAN identity in the RRC_IDLE paging occasions (i.e. UE checks both for Core Network id S-TMSI (SAE(System Architecture Evolution)-Temporary Mobile Subscriber Identity) and RAN id I-RNTI (Inactive Radio Network Temporary Identifier) in an overlapping paging occasion). It should be noted that the paging occasions in the two operational states are multiples of each other; e.g. the RRC_INACTIVE DRX cycles might be 1.28 seconds while RRC_IDLE state DRX occasions are once per 2.56 seconds, however as they coincide every second occasion, the UE may check whether the NW node is seeking the UE for resumption (i.e. the NW node still considers the UE to be in RRC_INACTIVE) and in such case, the UE implicitly changes its state back RRC_INACTIVE state and responds to the page and resumes its connection as if it had never left the RRC_INACTIVE state implicitly.

In some embodiments, the method 100 may comprise operating according to the third operational state, by determining whether a connection to the network node should be maintained and determining a duration of a timer of the network node, wherein the timer indicates when the device will be completely dropped by the network node. The method may further comprise performing a connection set up against the network node before the timer expires when it is determined that the connection to the network node should be maintained.

In some embodiments, the determination whether the connection to the network node should be maintained is based on one or more of knowledge of future communication transmissions to the network node, knowledge of a geographical area surrounding the network node, knowledge of a tracking area associated with the network node, and knowledge of one or more neighbouring cells.

Thus, in a scenario where the network node has decided that the communication device should transit to the third operational state (e.g. RRC_IDLE), the communication device may keep track on the timer of the network node which indicates when the communication device will be completely dropped by the network node, regardless of which state the communication device has determined to operate in. If the communication device operates in the third operational state (e.g. RRC_IDLE) it may still determine that it is beneficial to no be completely dropped by the network node based on any of the above described parameters and thus ensure that a connection set up is performed prior to the timer expiring. Similarly, if the network node thinks that the communication device operates in the third operational state, but the communication device implicitly operates according to the second operational state, it may also keep track of the timer of the network node and thus perform a timely connection set up in order to avoid that the connection is lost.

FIG. 2 is a schematic drawing illustrating a computer program product 200 comprising a non-transitory computer readable medium according to some embodiments. The non-transitory computer readable medium has stored there on a computer program comprising program instructions. The computer program is configured to be loadable into a data-processing unit 210, comprising a processor 220 and a memory 230 associated with or integral to the data-processing unit 210. When loaded into the data-processing unit 210, the computer program is configured to be stored in the memory 230. The computer program, when loaded into and run by the processor 220 is configured to cause execution of the method steps according to the method 100 described for FIG. 1.

FIG. 3 illustrates an apparatus 300 for a communication device operating in a wireless communication network for managing power consumption of the device according to some embodiments. The device is configured to operate according to first, second and third operational states for communication with a network node associated with the communication network, wherein the network node is configured to decide whether the device is to transit to the second or third operational state from the first operational state.

The apparatus 300 may e.g. be comprised in the communication device as described in conjunction with FIG. 1 and be configured to carry out the method 100 according to some embodiments. The apparatus 300 may in some embodiments comprise a controller 310 (CNTR) (e.g. a controlling module and/or controlling circuitry).

In some embodiments, the controller 310 may further comprise a database 311 (DB). The database 311 may e.g. be a memory module. The controller 310 may in some embodiments also comprise a configurer 312 (CONF), e.g. a configuration module. The controller 310 may in some embodiments also comprise a determiner 313, (DET) e.g. a determining module.

The apparatus 300 may also comprise a transceiver 320 (RX/TX) comprising e.g. a transceiver antenna circuit.

The controller 310 may in some embodiments, be configured to cause reception (e.g. by causing the transceiver 320 to receive) from the network node of an instruction to transit to a decided operational state when leaving the first operational state, the decided operational state being one of the second or third operational state. The controller 310 may also be configured to cause obtaining of information of a first network configuration applied by the network node for the second operational state and information of a second network configuration applied by the network node for the third operational state (e.g. by causing the configure 312 to obtain, possibly through the transceiver 320, the configurations). The controller 310 may also be configured to cause determination (e.g. by causing the determiner 313 to determine) to operate according to the second operational state or the third operational state based on the obtained information and transition to the determined operational state when leaving the first operational state regardless of the decided operational state.

In some embodiments, the communication device is configured to operate according to the determined operational state by the controller 310 being configured to cause retaining of a respective operational configuration associated with the determined operational state and the decided operational state (e.g. by causing the configure 312 to retain the respective operational configuration).

In some embodiments, the controller 310 is further configured to cause determination (e.g. by causing the determiner 313 to determine) of a delete frequency for when the communication device deletes data context associated with the communication device when the communication device operates in the second operational state.

In some embodiments, controller 310 is configured to cause determination of the delete frequency by causing collecting and storing in a database (e.g. the database 311) of the communication device, during communication with the network node, of context information pertaining to when and where the network node deletes data context associated with the communication device, when the communication device operates in the second operational state, wherein the delete frequency is determined based on the stored context information.

In some embodiments, the first operational state is a Radio Resource Control, RRC, connected operational state, the second operational state is a RRC inactive operational state and the third operational state is a RRC idle operational state.

In some embodiments, wherein the second operational state has a shorter Discontinuous Reception, DRX, cycle than the third operational state.

In some embodiments, the controller 310 is configured to cause determining (e.g. by causing the determiner 313) to operate according to the second or third operational state by being configured to cause the determination based on a size of at least one registration area associated with the second operational state.

In some embodiments, when the communication device is configured to operate according to the third operational state, controller 310 is configured to cause determination (e.g. by causing the determiner) of whether a connection to the network node should be maintained.

The controller 310 may also be configured to cause determination (e.g. by causing the determiner 313) of a duration of a timer of the network node, wherein the timer indicates when the device will be completely dropped by the network node.

The controller 310 may also be configured to cause performance of a connection set up against the network node before the timer expires when it is determined that the connection to the network node should be maintained.

In some embodiments, causing the determination of whether the connection to the network node should be maintained is based on one or more of knowledge of future communication transmissions to the network node, knowledge of a geographical area surrounding the network node, knowledge of a tracking area associated with the network node, and knowledge of one or more neighbouring cells.

In some embodiments, the controller 310 is configured to cause repeated evaluation of the determined operational state compared to the decided operational state based on current network conditions and determination of whether the determined operational state should be maintained based on the current network conditions (e.g. by causing the determiner to evaluate and determine).

In some embodiments, current network conditions may relate to at least one of time of the day, network topology, network congestion, device velocity, planned device activity, the determined delete frequency, a and network node tracking area size.

In some embodiments, the apparatus 300 may be comprised or form part of a communication device. E.g. the communication device as described in conjunction with FIG. 1 carrying out the method 100.

FIG. 4 illustrates a network scenario where the embodiments disclosed herein may be applied. FIG. 4 illustrates two network nodes 411 and 421 associated with respective network cells 410 and 420. A core network is illustrated as a cloud 440, and all though communication arrows 441, 412 are illustrated as being only between the network node 411, the core network 440 and a communication device 430, communication may similarly be performed between the network nodes 411 and 421, the network node 421 and the core network 440, and the network node 421 and the communication device 430. The core network together with the network node may constitute a wireless communication network.

In FIG. 4 the communication device 430 has been illustrated as being located in the serving area (i.e. cell) 410 associated with the network node 411.

The communication device 430 may e.g. be the communication device as described in conjunction with any of the previous FIGS. 1-3. It may e.g. comprise the apparatus 300 described for FIG. 3, and may carry out the method 100 as described for FIG. 1.

As previously noted, according to some embodiments, the communication device 430 may determine whether there is an RRC_INACTIVE state mismatch between the communication device 430 and the network node 411 by obtaining network configurations associated with the second and third operational states. The communication device 430 may e.g. determine whether context has been deleted in the network node while the UE is in the second operational state, e.g. RRC_INACTIVE state. The communication device may e.g. determine this based on that when the communication device 430 tries to resume a connection with the network node, it simply cannot without performing a new connection set up towards the node.

Overtime, the communication device may keep track of whether this is a reoccurring behaviour of the network maintained e.g. by the core network 440 and whether this behaviour is connected to certain deployment area (e.g. PLMN, Cell(s), geographical area, or alike) and possibly to a certain network node and/or time of day, week, month, etc. For the same location/times, the communication device 430 may keep track of whether the NW-provided configurations (be it broadcast or dedicated) for the two states RRC_INACTIVE and RRC_IDLE differ. Such configurations could for example be different DRX cycle settings used for paging and/or different registration area sizes and timers leading to registration area update procedure by the communication device.

Furthermore, the communication device 430 may build up knowledge about its upcoming user data exchange needs based on its user(s), and/or the application that is to be started, and/or its location/time, etc.

Based on the information above, the communication device 430 may decide whether a potential state mismatch is costly for the communication device in terms of power consumption. For example, in case the device 430 assumes that it will be in very frequent transitions and perform small data transactions (due to e.g. small registration area sizes), then it may determine that it is more beneficial to be in the second operational state, e.g. RRC_INACTIVE state even if potentially shorter DRX cycles are configured by the NW for this state. In such case, the device 430 does not take any risk to leave the state based on assumptions described herein.

As noted above, the device 430 can build up knowledge about NW deletion of device context when it tries to resume a connection in which case the resumption "fails" and the NW asks the device 430 to continue with an ordinary RRC Setup procedure. The device 430 may build up a database and track whether this is a common behaviour of the NW at some occasions (time of day) and locations. It may e.g. determine whether this context deletion always happens when the device 430 crosses a border of two gNBs (e.g. the network nodes 411 and 421) not having an interface for fetching the device context from each other. Alternatively or additionally, at some locations with heavy data traffic the gNBs cannot afford to maintain all necessary device contexts and delete them more often than other occasions. In case the device 430 can with high probability assume that its context is deleted and RRC_IDLE state is favourable, then it is unnecessary for the UE to remain in RRC_INACTIVE as it will only be operating in this state in vain since the connection will most probably not be resumed anyways regardless of what state the network has indicated that the device should transit to.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

According to some embodiments, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a mobile terminal.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely for illustrative purpose and by no means limiting. Instead, all variations that fall within the range of the claims are intended to be embraced therein.

The invention claimed is:

1. A method of a wireless communication device operating in a wireless communication network for managing power consumption of the wireless communication device, wherein the wireless communication device is configured to operate according to first, second and third operational states for communication with a network node associated with the communication network said method performed by the wireless communication device, comprising:
   receiving from the network node an instruction to transit to a decided operational state when leaving the first operational state, the decided operational state being one of the second or third operational state;
   obtaining information of a first network configuration applied by the network node for the second operational state and information of a second network configuration applied by the network node for the third operational state;
   determining to operate according to the second operational state or the third operational state based on the obtained information;
   determining whether to transition to the decided operational state received from the network node or the determined operational state when leaving the first operational state;
   transitioning to the determined operational state when leaving the first operational state regardless of the decided operational state; and
   determining to operate according second or third operational state based on determining a delete frequency for when the network node deletes data context associated with the wireless communication device when the wireless communication device operates in the second operational state.

2. The method according to claim 1 further comprising operating according to the determined operational state by retaining a respective operational configuration associated with the determined operational state and the decided operational state.

3. The method according to claim 1, wherein determining the delete frequency comprises
   collecting and storing in a database of the wireless communication device, during communication with the network node, context information pertaining to when and where the network node deletes data context associated with the wireless communication device, when the wireless communication device operates in the second operational state, wherein the delete frequency is determined based on the stored context information.

4. The method according to claim 1, wherein the first operational state is a Radio Resource Control, RRC, connected operational state, the second operational state is an RRC inactive operational state and the third operational state is an RRC idle operational state.

5. The method according to claim 1, wherein the second operational state has a shorter Discontinuous Reception, DRX, cycle than the third operational state.

6. The method according to claim 1, wherein determining to operate according to the second or third operational state is based on a size of at least one registration area associated with the second operational state.

7. The method according to claim 1, further comprising operating according to the third operational state, by
   determining whether a connection to the network node should be maintained;
   determining a duration of a timer of the network node, wherein the timer indicates when the wireless communication device will be completely dropped by the network node; and
   performing a connection set up against the network node before the timer expires when it is determined that the connection to the network node should be maintained.

8. The method according to claim 7, wherein the determination whether the connection to the network node should be maintained is based on one or more of knowledge of future communication transmissions to the network node, knowledge of a geographical area surrounding the network node, knowledge of a tracking area associated with the network node, and knowledge of one or more neighbouring cells.

9. The method according to claim 1, further comprising
   repeatedly evaluating the determined operational state compared to the decided operational state based on current network conditions; and
   determining whether the determined operational state should be maintained based on the current network conditions.

10. The method according to claim 9, wherein current network conditions relate to at least one of time of the day, network topology, network congestion, device velocity, planned device activity, the determined delete frequency, and network node tracking area size.

11. A computer program product comprising a non-transitory computer readable medium, wherein the non-transitory computer readable medium has stored there on a computer program comprising program instructions, wherein the computer program is configured to be loadable into a data-processing unit, comprising a processor and a memory associated with or integral to the data-processing unit, wherein when loaded into the data-processing unit, the computer program is configured to be stored in the memory, wherein the computer program, when loaded into and run by the processor is configured to cause the processor to execute method steps according to any of the methods described in conjunction with claim 1.

12. An apparatus for a wireless communication device operating in a wireless communication network for managing power consumption of the wireless communication device, wherein the wireless communication device is configured to operate according to first, second and third operational states for communication with a network node associated with the communication network and wherein the network node is configured to decide whether the wireless communication device is to transit to the second or third operational state from the first operational state, said apparatus comprising a controller configured to cause:
   reception from the network node of an instruction to transit to a decided operational state when leaving the first operational state, the decided operational state being one of the second or third operational state;
   obtaining of information of a first network configuration applied by the network node for the second operational state and information of a second network configuration applied by the network node for the third operational state;
   determination to operate according to the second operational state or the third operational state based on the obtained information;
   determination of whether to transition to the decided operational state received from the network node or the determined operational state when leaving the first operational state;
   transition to the determined operational state when leaving the first operational state regardless of the decided operational state; and
   cause determination of a delete frequency for when the wireless communication device deletes data context associated with the wireless communication device when the communication device operates in the second operational state.

13. The apparatus according to claim 12, wherein the wireless communication device is configured to operate according to the determined operational state by the controller being configured to cause retaining of a respective operational configuration associated with the determined operational state and the decided operational state.

14. The apparatus according to claim 12, wherein the controller is configured to cause determination of the delete frequency by causing
   collecting and storing in a database of the wireless communication device, during communication with the network node, of context information pertaining to when and where the network node deletes data context associated with the wireless communication device, when the wireless communication device operates in the second operational state, wherein the delete frequency is determined based on the stored context information.

15. The apparatus according to claim 12, wherein the first operational state is a Radio Resource Control, RRC, connected operational state, the second operational state is a RRC inactive operational state and the third operational state is a RRC idle operational state.

16. The apparatus according to claim 12, wherein the second operational state has a shorter Discontinuous Reception, DRX, cycle than the third operational state.

17. The apparatus according to claim 12, wherein the controller is configured to cause determining to operate according to the second or third operational state by being configured to cause the determination based on a size of at least one registration area associated with the second operational state.

18. The apparatus according to claim 12, wherein when the wireless communication device is configured to operate according to the third operational state, controller is configured to cause
   determination of whether a connection to the network node should be maintained;
   determination of a duration of a timer of the network node, wherein the timer indicates when the wireless communication device will be completely dropped by the network node; and
   performance of a connection set up against the network node before the timer expires when it is determined that the connection to the network node should be maintained.

19. The apparatus according to claim 18, wherein causing the determination of whether the connection to the network node should be maintained is based on one or more of knowledge of future communication transmissions to the network node, knowledge of a geographical area surrounding the network node, knowledge of a tracking area associated with the network node, and knowledge of one or more neighbouring cells.

20. The apparatus according to claim 12, wherein the controller is configured to cause
- repeated evaluation of the determined operational state compared to the decided operational state based on current network conditions and
- determination of whether the determined operational state should be maintained based on the current network conditions.

21. The apparatus according to claim 20, wherein current network conditions relate to at least one of time of the day, network topology, network congestion, device velocity, planned device activity, the determined delete frequency, and network node tracking area size.

22. A communication device comprising the apparatus according to claim 12.

* * * * *